(12) United States Patent
Elberson

(10) Patent No.: US 11,353,896 B2
(45) Date of Patent: Jun. 7, 2022

(54) MIXED FLUID DELIVERY SYSTEM

(71) Applicant: Autoquip, Inc., Menomonee Falls, WI (US)

(72) Inventor: Michael D. Elberson, Elm Grove, WI (US)

(73) Assignee: Autoquip, Inc., Menomonee Falls, WI (US)

( * ) Notice: Subject to any disclaimer, the term of this patent is extended or adjusted under 35 U.S.C. 154(b) by 0 days.

(21) Appl. No.: 16/279,433

(22) Filed: Feb. 19, 2019

(65) Prior Publication Data

US 2019/0187731 A1 Jun. 20, 2019

Related U.S. Application Data

(62) Division of application No. 13/444,668, filed on Apr. 11, 2012, now Pat. No. 10,289,127.

(60) Provisional application No. 61/474,828, filed on Apr. 13, 2011.

(51) Int. Cl.
 G05D 11/13 (2006.01)
 G05D 11/02 (2006.01)

(52) U.S. Cl.
 CPC ........... *G05D 11/132* (2013.01); *G05D 11/02* (2013.01); *G05D 11/13* (2013.01); *G05D 11/131* (2013.01)

(58) Field of Classification Search
 CPC .... G05D 11/132; G05D 11/131; G05D 11/02; G05D 11/13
 See application file for complete search history.

(56) References Cited

U.S. PATENT DOCUMENTS

| | | | |
|---|---|---|---|
| 5,388,761 A * | 2/1995 | Langeman | B01F 15/00285 222/138 |
| 5,490,726 A * | 2/1996 | Davis | B01F 5/0689 366/152.1 |
| 5,553,493 A | 9/1996 | Box et al. | |
| 6,148,839 A | 11/2000 | Gonske | |
| 6,159,442 A | 12/2000 | Thumm et al. | |
| 6,220,747 B1 | 4/2001 | Gosselin | |
| 6,684,959 B1 * | 2/2004 | Juidici | A62C 5/02 169/13 |
| 2005/0103889 A1 * | 5/2005 | Langeman | B05B 15/55 239/303 |
| 2007/0057082 A1 * | 3/2007 | McGloughlin | B05B 12/006 239/11 |
| 2008/0185097 A1 | 8/2008 | Walter | |
| 2011/0031272 A1 | 2/2011 | Comiskey et al. | |

* cited by examiner

*Primary Examiner* — Qingzhang Zhou
(74) *Attorney, Agent, or Firm* — Boyle Fredrickson S.C.

(57) ABSTRACT

An apparatus and method for operating and calibrating a paint mixture delivery system includes a positive displacement fluid cylinder and a linear transducer that monitors operation of the positive displacement fluid cylinder. A controller is connected to a servo drive whose operation manipulates the performance of the positive displacement fluid cylinder. Operation of the fluid delivery system is controlled such that the ratio of paint or resin to catalyst or hardener can be accurately controlled and calibration of the discrete fluid flow sensors can be quickly and conveniently calibrated to assure delivery of the respective fluids are the desired mixture ratio.

10 Claims, 5 Drawing Sheets

MIXED FLUID DELIVERY SYSTEM

CROSS-REFERENCE TO RELATED APPLICATIONS

This is a divisional patent application that claims priority to U.S. patent application Ser. No. 13/444,668 filed on Apr. 11, 2012 titled "Mixed Fluid Delivery System" and which claims priority to U.S. Provisional Patent Application Ser. No. 61/474,828 filed on Apr. 13, 2011 titled "Mixed Fluid Delivery System" and the disclosures of which are expressly incorporated herein.

BACKGROUND OF THE INVENTION

In spray paint operations, a paint fluid or resin, commonly in the form of a liquid, is mixed with one or more constituents, such as hardeners and/or liquid or solid color additives, prior to application of the mixed material to a work surface. Commonly, the user must either manually mix the constituents prior to application of the final mixture and/or provide a metered introduction of the constituents into a fluid flow to attain a desired mixture. The repeatability of generating a given fluid mixture is substantially limited by the ability of a technician to repeatedly measure and combine the constituent fluids and additives in an accurate manner to produce the desired mixture. Additionally, the consistent attention to the operation of the discrete systems of the mixed fluid delivery system requires a highly skilled or trained operator to ensure repeatable desired results during each material application cycle.

Automatic mixing devices overcome some of the shortcomings associated with manual mixing requirements but present their own drawbacks. FIGS. 3-5 show an exemplary prior art two-part fluid delivery system or fluid mixing machine that adds a catalyst or a hardener to a fluid paint stream. Such mixing machines are widely used during the coating or painting of various metal, carbon or fiber, or plastic based material parts commonly configured as automotive or vehicle body panels and the like.

In the automotive environment, such parts are most often finished with what is commonly understood as low bake temperature coatings. Prior to the advent of automatic mixing machines, a finisher or paint applicator personnel would manually add hardener to the resin or paint in a batch form and attempt to utilize the batch before expiration of the usable or pot-life of the mixture. Such pre-application preparation of the mixture requires an estimation of the total material needed to treat or coat all of the desired parts. Such activity commonly requires the personnel to estimate both fluid material consumption as well as the amount of material that the given operator can consume within the duration or pot life of the particular material mixture.

Depending on a number of commonly understood parameters including ambient temperature and humidity, constituent composition and ratios, desired product characteristics, substrate conditions, etc., the ratio of hardener to color fluid, resin or paint can commonly vary from ratios of 1:1 to less than 100:1. Such bulk batching commonly results in substantial waste with operators mixing more than adequate amounts of material to avoid "running short" or consuming all of the pre-application mixed material before all of the desired parts have been treated.

With the variable desired ratio ranges, ratio repeatability is typically only about 5% and incorrect ratios can result in complications and/or inoperability of the paint system during application of the color mixture or a less than desired and/or acceptable finished or cured paint layer. If insufficient hardener or catalyst is added to the fluid paint, the paint mixture will normally not dry or cure as desired. Excessive hardener or catalyst detrimentally impacts pot-life and can also yield undesirable or unacceptable finish part quality. Such complications commonly result in requiring that the affected parts be cleaned and retreated or repainted and/or discarded altogether. Unexpected pot-life limits can also detrimentally affect and/or damage the operability of the material applicator devices.

Many automatic mixing devices commonly use multiple electro-mechanical flow meters that monitor the individual volumes of paint or resin and hardener for ratio assurance. Such flow meters are commonly provided as two meshed gears that turn freely in the respective fluid flow. A gear tooth sensor monitors movement of the teeth of a respective gear to assess the fluid flow. Each tooth represents a specific volume. An exemplary standard volume per gear tooth is 0.12 cc/gear tooth. Understandably, other volume flow meters are available for other applications.

Many paints or resins and hardeners are relatively thin or have low fluid viscosities such that, even with the relatively close mechanical association of the gears and the corresponding housing of such flow meters, some of the fluid material can pass around and/or through the gears in a manner that detracts from the accuracy of the respective fluid measurement. Low relative fluid flow rates can also exacerbate the ability to accurately assess the respective fluid flow. Accordingly, such fluid delivery systems must be diligently monitored and/or frequently calibrated to ensure accurate assessment and monitoring of the respective constituent fluid material flows. Although frequent system calibration reduces the potential for inaccurate operation of the respective flow meters, repeated calibration of the flow sensor detracts from the "automatic" nature of such fluid delivery systems and wastes both operating time and materials.

Calibration of such automatic fluid delivery systems commonly requires a multiple step verification process. FIGS. 3-5 show an exemplary prior art automatic paint application system. During a combined fluid flow verification process, the operator must verify the volume of the paint, resin flow, and combined volume to assess the operability of the system. As shown in FIG. 3, in first step of assessing operation of the system the operator draws a sample from a designated port 20 into a graduated cylinder or beaker 22. The value of the measured volume is entered into a controller 24.

Referring to FIG. 4, this fluid measuring process is then repeated for the additive or hardener fluid path of the fluid mixing system. As shown in FIG. 4, the delivery system includes a second designated port 30 that is in fluid communication with a hardener fluid flow path. A hardener sample is acquired with another graduated cylinder 32 such that the volume of hardener delivered can also be determined or assessed. Controller 24 is in communication with a pair of toothed gear flow meters 38, 40 that electro-mechanically assess the flow of the restrictive additive and resin flows in the manner described above. These values are communicated to controller 24 as the detected flow values. The value of the acquired volumes of hardener and resin are entered into controller 24 which thereby compares the discrete measured volumes with the discrete detected flow values to calibrate the respective flow meter 38, 40 associated with delivery of the respective hardener and resin materials.

After the individual flow meters 38, 40 have been calibrated, the fluid material delivery ratio can be assessed. Referring to FIG. 5, to verify the delivery ratio between the paint material and/or resin and the hardener, the user uses two beakers 34, 36 during concurrent delivery of both the paint and/or resin fluid and the liquid hardener during operation of the delivery system. The two constituents or fluid components flow concurrently into separate beakers 34, 36. Visual inspection of beakers 34, 36 allows the user to visually and then mathematically verify the ratio between the delivery of the paint and/or resin and the hardener. After each calibration process, the user must clear or clean the dedicated sample ports 20, 30 as well as the various cylinders 22, 32, 34, 36 associated with the acquisition of the various samples.

The calibration and delivery ratio verification process is cumbersome and time consuming and includes such drawbacks that many users neglect to perform the operational verification processes. As alluded to above, neglecting confirmation of the operational integrity of the paint delivery system can result in less than desired, unexpected, and/or unacceptable constituent fluid deliver performance and yield potentially unacceptable part or application quality as well as possible damage to the underlying paint application system. Although hindering operation of the application system until completion of an operational verification process would result in more timely completion of the verification calibration (if not bypassed), mandating such verification does not resolve the inefficiencies associated with the manual verification and calibration of the various sensors and volume assessments.

Therefore, there is a need for a mixed fluid delivery system that both accurately delivers desired amounts of constituent fluids and can be quickly and conveniently assessed to verify the operational integrity of the fluid delivery system with respect to preset operating conditions.

BRIEF DESCRIPTION OF THE INVENTION

The present invention provides a mixed fluid delivery system that overcomes one or more of the aforementioned drawbacks. One aspect of the invention discloses an apparatus and method for operating and calibrating a paint mixture delivery system. The delivery system includes at least one positive displacement fluid cylinder and a linear transducer that monitors operation of the positive displacement fluid cylinder. A controller is connected to a servo drive whose operation manipulates the performance of the positive displacement fluid cylinder. Operation of the fluid delivery system is controlled such that the ratio of paint or resin to catalyst or hardener can be accurately controlled and calibration of the discrete fluid flow sensors can be quickly and conveniently calibrated to assure delivery of the respective fluids at an acceptable desired mixture ratio.

Another aspect of the invention disclosed a mixed fluid paint delivery system having a cylinder type catalyst flow pump constructed to introduce an amount of a catalyst to a resin flow. A transducer is configured to monitor operation of the cylinder type catalyst flow pump and a controller is connected to the transducer and configured to determine a resin flow and manipulate operation of the cylinder type catalyst flow pump to provide a resin and catalyst mixture having a desired resin to catalyst ratio.

Another aspect of the invention discloses a paint delivery system having a first inlet that is connectable to a paint resin source and a second inlet connectable to an additive to be added to a flow of paint resin to form a paint mixture deliverable to an applicator. The paint delivery system includes a linear pump that is connected to one of the first inlet and the second inlet and a controller that is configured to monitor operation of the linear pump and control flow from the first inlet and the second inlet to maintain a desired ratio of constituents in the paint mixture at the applicator.

Another aspect of the invention includes a method of calibrating a paint mixture delivery system. The method includes communicating a mixture that includes a resin and an additive to a container. A resin flow is determined by subtracting a measured additive flow volume measured with a linear transducer from a volume of the container after communication of the mixture thereto. The determined resin flow is compared to a measured resin flow and a resin flow meter calibration is adjusted from a current condition if the determined resin flow varies more than an acceptable deviation from the calculated resin flow.

These and other aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

Figure 1:
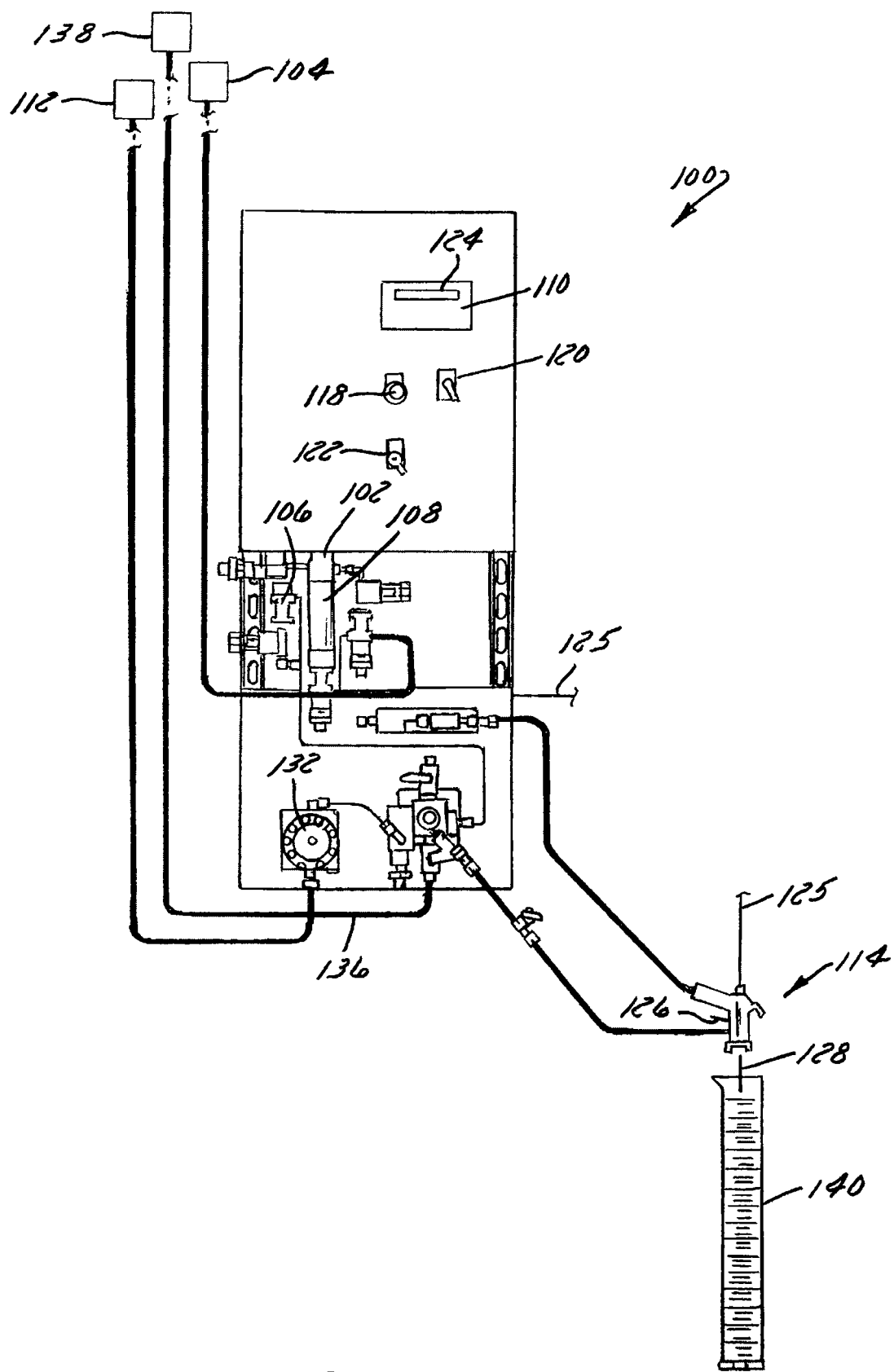
FIG. 1 is an elevation view of a dual fluid delivery system according to the present invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. Such terms are not limited to direct connection but include connection through other elements where such connection is recognized as being equivalent by those skilled in the art.

DETAILED DESCRIPTION OF THE PREFERRED EMBODIMENT

FIG. 1 shows a mixed fluid delivery system 100 according to a preferred embodiment of the present invention. Unlike the mixed fluid delivery system shown in FIGS. 3-5, which includes like pump and sensor assemblies associated with moving each of the respective fluid materials through the system, system 100 includes a servo driven positive displacement cylinder 102 that pumps the catalyst or hardener from a bulk supply or source 104. Delivery system 100 is configured to deliver constituent composition and ratios of catalyst or hardener to color fluid, resin or paint that can vary between 0:1 to 500:1 and can commonly vary from ratios of 1:1 to less than 100:1. Displacement cylinder 102 eliminates the detriments attributable to slip common to gear flow monitoring devices and which is particularly problematic at low flows and when used with low viscosity fluids. As explained further below, displacement cylinder 102 allows system 100 to maintain operation at higher resin to catalyst ratios and improves the accuracy with which the operation of system 100 can be monitored.

Cylinder 102 is equipped with a linear transducer 106 that measures the movement of a piston 108 associated with the cylinder. Transducer 106 is electrically connected to a controller 110 that assesses the signal of transducer 106 to monitor the travel distance of piston 108, and therefrom, to calculate a volume of material associated with the operation of the cylinder as can be calculated from the longitudinal travel of the piston as it relates to the cross-sectional area of cylinder 102. Controller 110 is preferably a programmable logic controller such as those commonly available from Allen Bradley but it is appreciated that any number controls, control devices, or simply controllers can be configured for operation and monitoring of system 100. Preferably, controller 110 is configured to receive a number of input signals from various devices such as sensors and/or pumps of system 100 and generate a one or more outputs that can be directed to the same or different devices to manipulate the operation of the same.

It is further appreciated that controller 110 include one or more inputs 118, 120, 122 in the form of switches and/or buttons that are configured to be manipulated by an operator to interact with controller 110 and thereby interfere and/or manipulate operation of system 100. It is appreciated that the user can input a value associated with attaining a desired ratio of resin to additive at the applicator or application device 114 during operation of system 100. As explained above, such ratios can be determined by parts being coated, resin and additive compositions, desired cure parameters, etc. It is further appreciated that controller 110 can include an optional output, indicator, or display 124 configured to communicate information regarding the operation of system 100 to a user. It is appreciated that the modality of the information associated with the output of display 124 can be one or more of audible, visual, or tactile, or electrically to another device configured to generate similar outputs for communicating information to the user as to the instantaneous or changes to any of the sensor or flow manipulating systems of system 100. It is appreciated that the one or more inputs and outputs associated with the operation of controller 110 can be used to generate wholly automatic operation of the system when a user may or may not be provided an alert as to a change in the operating condition or could be required to initiate a response to the respective input/output signal, such as manipulating a valve, switch, dial, or button to provide semi-automatic operation of the system or operation that requires user interaction.

Resin material, such as paint, is communicated to system 100 from a source 112. The resin and hardener or catalyst are delivered to mixing system 100, mixed and subsequently communicated to one or more applicators or application devices 114, such as a paint gun. Paint gun 114 is commonly understood to be connected to an air flow or gas source 125 and constructed such that when the mixed fluid is delivered to the gun, and a trigger 126 is activated, a highly atomized flow of paint 128 is expelled or sprayed from the gun in a controlled manner in an application direction. It is appreciated that system 100 can deliver one or more fluid streams at the same or different operating specifications to allow concurrent utilization of system 100 for different parts or the application of a uniform material to different or simply larger unitary parts and/or assemblies. It is further appreciated that should any of the respective delivery or pump systems of system 100 require an air flow for operation, system 100 can also be fluidly connected to air source 125 either in series or parallel with applicator 114. It is appreciated that flow of paint 128 can be manipulated by manipulation of both the air flow associated with source 124 and the tip orientation and structure of application device 114.

A flow meter or sensor 132, such as a gear-type flow meter as discussed above, monitors the flow of resin communicated through system 100. As the volume of the resin flow is generally higher than any other additive or catalyst flow, gear type flow meters can be adequately calibrated to assess the resin flow within an acceptable degree of inaccuracy associated with paint applications but the paint or resin flow can nonetheless be calibrated in the manner discussed further below. It is further appreciated that flow meter or sensor 132 could be replaced with the cylinder and transducer pair. It is appreciated that the cross-sectional stroke of such a configuration could be manipulated to approach the ratio of the respective fluid.

System 100 also includes a solvent inlet 136 that is fluidly connected to a solvent source 138 for removal of residuals of prior materials and cleaning of applicator 114 of system 100 as is well understood in the art. It is further envisioned that system 100 include one or more connections and/or assemblies associated with moving the catalyst, resin, and solvent to and through the applicable portions or passages of system 100. It is envisioned that such systems can include fluid specific pumps, one or more automatically, manually, or combination thereof of selectively operable or controlled valves, and/or pressurization of the respective sources to facilitate passage of the materials to the respective fluid connections of system 100. It is appreciated that there are a number of modalities and configurations associated with communicating and/or limiting the communication of the respective fluids between sources 104, 112, 138, system 100, and applicator 114.

Figure 3:
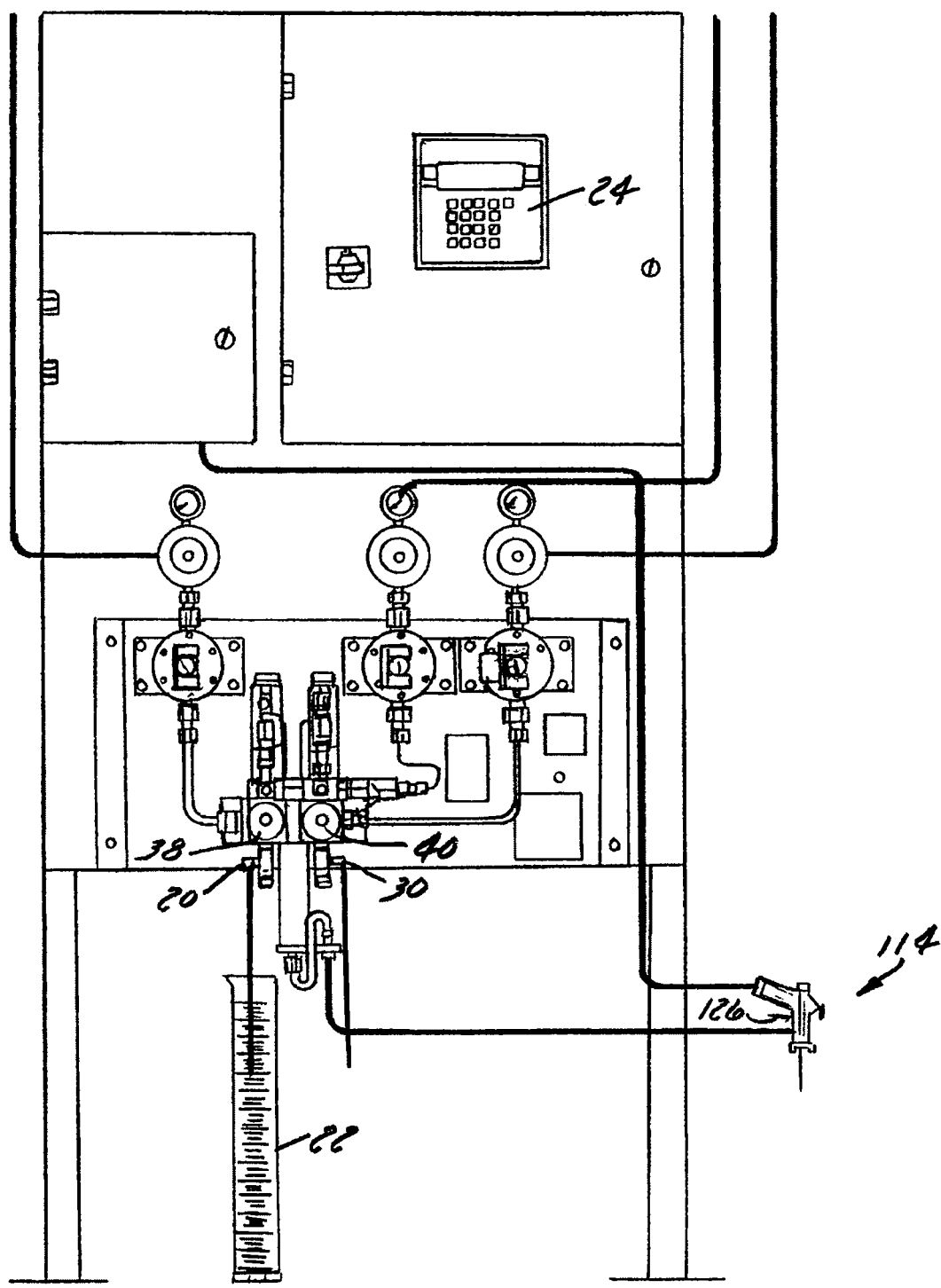
FIG. 3 is a view similar to FIG. 1 of a prior art paint delivery system.
Figure 4:
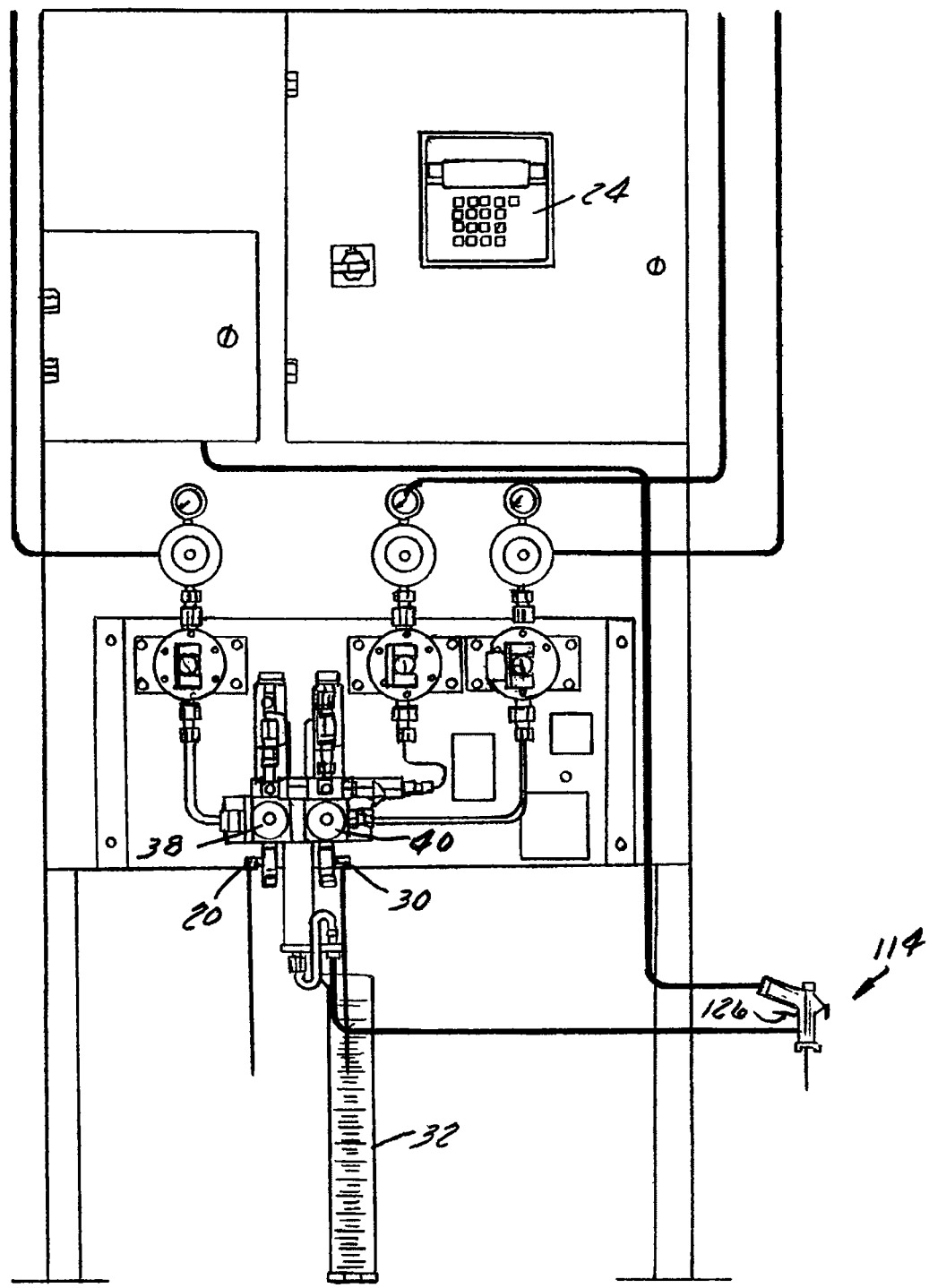
FIG. 4 is a view similar to FIG. 3 and shows a second step of a calibration process associated with assessing operation of the paint delivery system.
Figure 5:
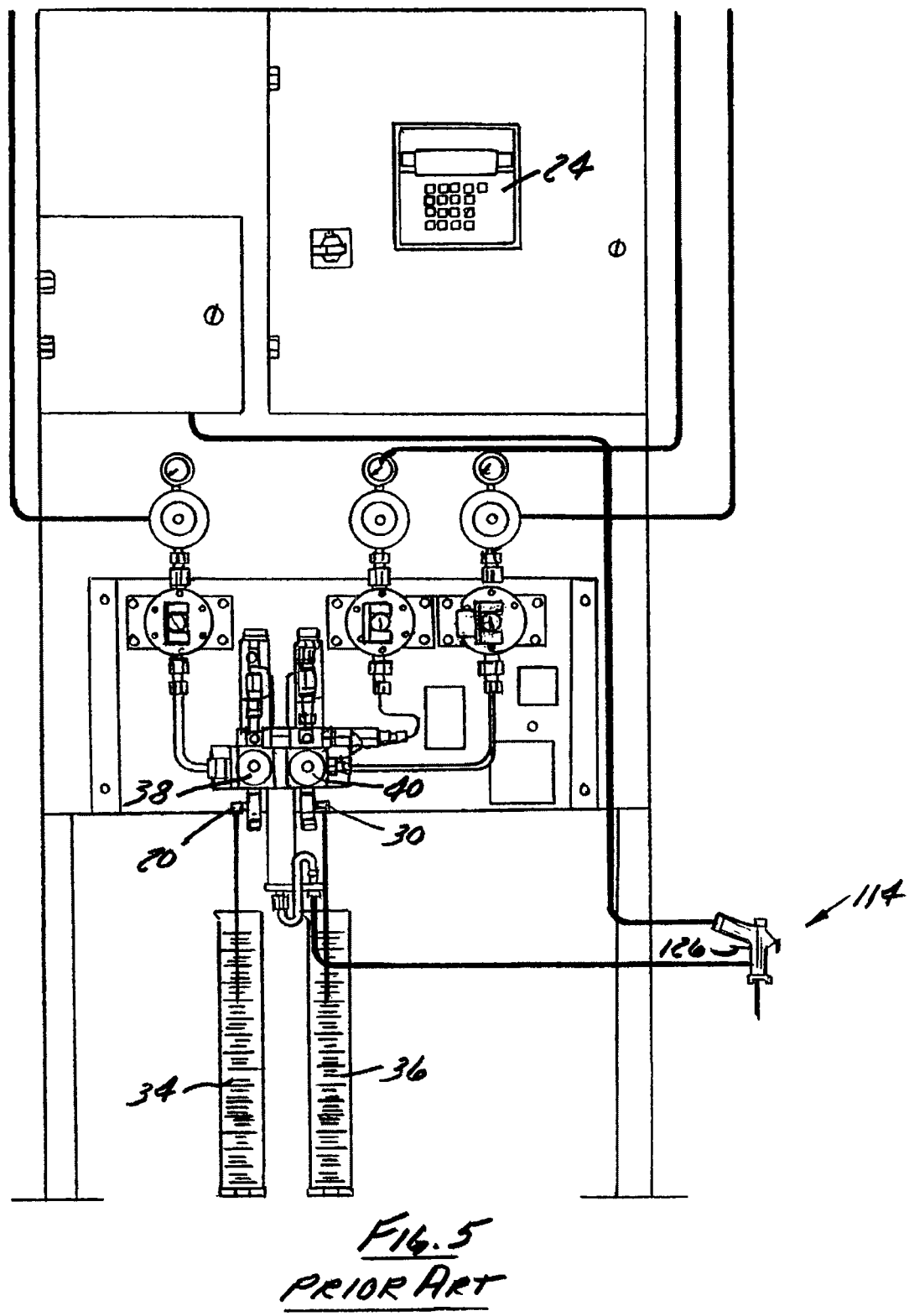
FIG. 5 is a view similar to FIG. 3 and shows a third step of the calibration process associated with assessing operation of the paint delivery system.

Regardless of the delivery methodology, as catalyst pump or cylinder 102 has no slip, unlike the fluid delivery system shown in FIGS. 3-5, fluid mixing system 100 can be calibrated and verified in a one process with only one sample beaker and with no supplemental system outlet ports. As explained further below, regardless of the fluid delivery methodology and the means of the assessing the respective fluid flows, it is envisioned that the fluid flow calibration process as described herein can also accurately assess the respective fluid flows for those fluid flow systems wherein the respective fluid flows are both assessed with either separate and/or a combined gear-type fluid flow meters—commonly referred to a dual flow meter configuration.

Figure 2:
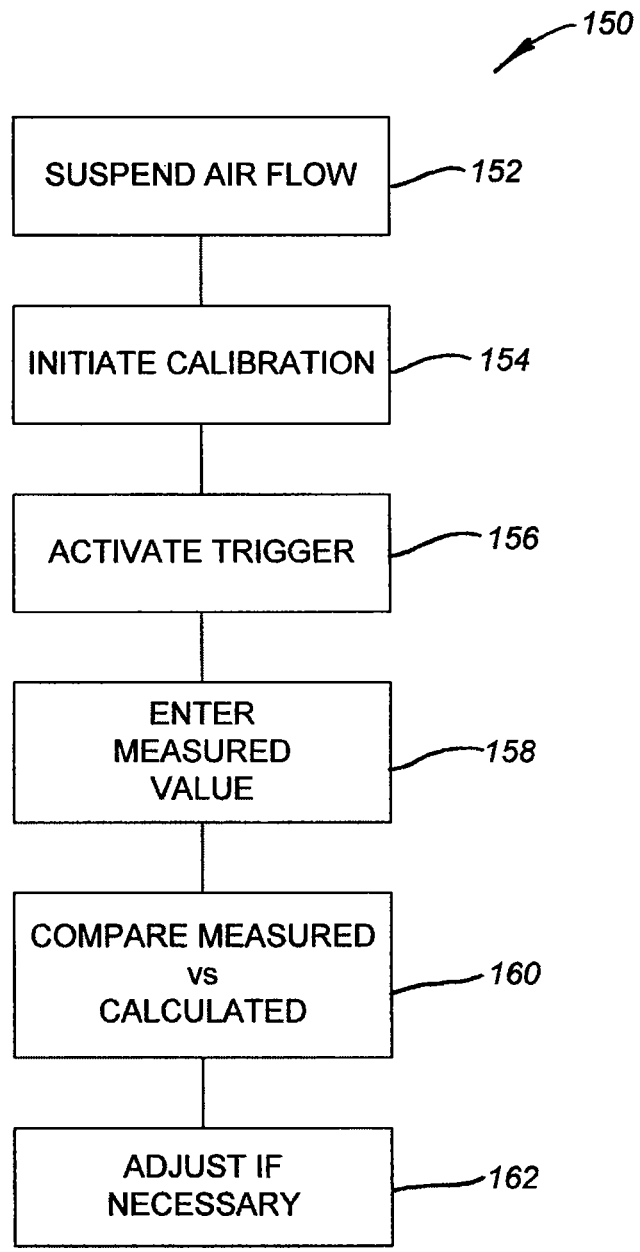
FIG. 2 is a flow chart showing a calibration sequence associated with confirming desired operation of the fluid delivery system shown in FIG. 1.

Referring back to FIGS. 1 and 2, during a calibration process 150 of system 100, the user merely needs to operate the system as through applying material but without the flow of atomization gas. The user can suspend the flow of atomization gas or provide an instruction to controller 110 to suspend the atomization gas flow 152 during a calibration sequence. Preferably, the user provides a calibrate instruction 154 to controller 110 and activates 156 trigger 126 of applicator 114 while directing non-atomized but mixed material 128 into a measuring device such as a graduated cylinder 140.

During collection of the measured sample, controller 110 monitors the total fluid flow as determined by the combined assessment of the operation of cylinder 102 and transducer 106 and sensor 132. The user then enters a value of the measured flow 158, which includes resin and additive, into controller 110. Controller 110 then compares 160 the measured flow value 158, as determined by graduated cylinder 140, to the calculated value, as determined as by the desired ratio and operation of cylinder 102 and transducer 106 and resin flow sensor 132.

If the calculated volume value and the measured volume value information are within an acceptable deviation of the desired ratio of operation of the paint delivery system, integrity of system 100 has been confirmed and, with the introduction of the atomization gas and completion of the calibration sequence, system 100 is configured for operation. If the calculated volume value is greater than or less than the measured volume value, or a tolerable deviation associated with the same, such an indication, based on the reliability of the accuracy of cylinder 102 and transducer 106, indicates an unacceptable calibration of resin gear type flow sensor 132.

During such an event, controller 110 assigns a new value 162 to the operation of sensor 132 to yield delivery of a mixed fluid material that is within an acceptable range of the desired or expected mixture ratio. That is, since the volume of the additive, catalyst or hardener is known as a function of the construction and operation of cylinder 102, the volume or value of the resin material flow can be mathematically calculated by controller 110 as the value of the total volume acquired in beaker 140, as entered into controller 110 by the user, minus the volume of material delivered by cylinder 102, as communicated/determined by controller 110 via communication with transducer 106.

Preferably, system 100 will tolerate sensor operation and thereby ratio deviations from the desired ratio for those ratio ranges that are known to yield parts of acceptable quality. In a similar manner, system 100 may suspend operation of the system and/or manipulate the operation of sensor 132 and thereby the respective flow associated therewith if the calculated ratio is beyond desired thresholds or if the measured ratio is incapable of producing acceptable finish parts. If system 100 has confirmed the accuracy of operation of sensor 132, or adjusted the value associated with the operation of sensor 132, the user can confirm the efficacy of the calibration via repeating of sequence 150, or proceed to treatment of parts with the simple reintroduction of the atomization gas flow. That is, after calibration sequence 150, system 100 is ready for near immediate operation. System 100 allows the user to quickly and accurately assess the operation of system 100 with limited waste and in an efficient manner. The ease and efficiency of the ratio check and confirmation increases the likelihood that users will more periodically assess the operability of system 100.

As alluded to above, the calibration verification associated with process 150 is also usable with dual flow control systems with the acquisition of a single sample unlike the process associated with the systems shown in FIGS. 3-5. During such a process, controller 110 is configured to record the two volumes as assessed with the respective flow meters. Controller 110 then displays the total recorded volume associated with the sample acquisition duration. A user can then perform the comparison of the measured volume to the displayed volume or enter the measured volume into controller 110 if the measured volume is not the same as the recorded and displayed volume. If the measured volume is the same or within a tolerable range or deviation from the recorded volume, the user has verified calibration of the respective flow meters. If the measured and the recorded values are not within a tolerable or acceptable range, controller 110 can be configured to manipulate the value of one or both of the outputs of the respective flow meters, most likely the catalyst flow value for the reasons discussed in the background of the application, thereby achieving calibration of the underlying fluid delivery system. It is appreciated that such a single step calibration verification would result in less waste as more as a higher likelihood that technicians and/or users will perform the calibration and calibration verification processes regardless of the specific configuration of the underlying fluid connections, valves, and number of applicators associated with the respective fluid delivery system.

Therefore, one embodiment of the invention includes a mixed fluid paint delivery system having a cylinder type catalyst flow pump constructed to introduce an amount of a catalyst to a resin flow. A transducer is configured to monitor operation of the cylinder type catalyst flow pump and a controller is connected to the transducer and configured to determine a resin flow and manipulate operation of the cylinder type catalyst flow pump to provide a resin and catalyst mixture having a desired resin to catalyst ratio.

Another embodiment of the invention includes a paint delivery system having a first inlet that is connectable to a paint resin source and a second inlet connectable to an additive to be added to a flow of paint resin to form a paint mixture deliverable to an applicator. The paint delivery system includes a linear pump that is connected to one of the first inlet and the second inlet and a controller that is configured to monitor operation of the linear pump and control flow from the first inlet and the second inlet to maintain a desired ratio of constituents in the paint mixture at the applicator.

Another embodiment of the invention includes a method of calibrating a paint mixture delivery system. The method includes communicating a mixture that includes a resin and an additive to a container. A resin flow is determined by subtracting a measured additive flow volume measured with a linear transducer from a volume of the container after communication of the mixture thereto. The determined resin flow is compared to a measured resin flow and a resin flow meter calibration is adjusted from a current condition if the determined resin flow varies more than an acceptable deviation from the calculated resin flow.

Of course, specific details of the preferred embodiment as described herein are not to be interpreted as limiting the scope of the invention, but are provided merely as a basis for the claims and for teaching one skilled in the art to variously practice and construct the present invention in any appropriate manner. Changes may be made in the details of the construction of various components of the delivery system without departing from the spirit of the invention especially as defined in the following claims.

What is claimed is:

1. A paint delivery system comprising:
   a first inlet connectable to a paint resin source;
   a second inlet connectable to an additive to be added to a flow of paint resin to form a paint mixture deliverable to an applicator;
   a flow meter exposed to the flow of paint resin prior to addition of the additive;
   a linear displacement pump having a piston that is slideably associated with a cylinder connected to one of the first inlet and the second inlet; and
   a controller configured to monitor operation of the linear displacement pump via a linear transducer that measures linear displacement along an axis of translation of the piston relative to the cylinder and that is connected to the controller and the flow meter and control flow from the first inlet and the second inlet to maintain a desired ratio of constituents in the paint mixture at the applicator based at least in part on a signal from the linear transducer associated with displacement of the piston relative to the cylinder and manipulate calibration of the flow meter exposed to the flow of paint resin based at least in part on the signal from the linear transducer when the desired ratio of constituents is beyond a tolerable deviation between a calculated volume value and a measured volume value.

2. The paint delivery system of claim 1 wherein the controller is further configured to manipulate calibration of the flow meter in response to a comparison of the measured volume value of the paint mixture delivered to the applicator and an assessment of operation of the linear displacement pump based on the linear transducer and for a given duration.

3. The paint delivery system of claim 2 further comprising a third inlet connectable to a solvent source for communicating a solvent through the paint delivery system to the applicator.

4. The paint delivery system of claim 2 wherein at least one of a valve and the controller is configured to suspend communication of an atomizing fluid to the applicator during acquisition of the measured volume.

5. The paint delivery system of claim 4 further comprising at least one input connected to the controller and configured to allow a user to interact with the controller.

6. The paint delivery system of claim 1 wherein the desired ratio of constituents is adjustable between ratios of resin to catalyst between 0:1 to 500:1.

7. The paint delivery system of claim 1 wherein the controller is further configured to determine an amount of resin from a user input of a sample volume minus a flow value associated with operation of the linear displacement pump during acquisition of the sample volume.

8. The paint delivery system of claim 1 further comprising a paint resin flow meter that is exposed to the flow of paint resin and electrically connected to the controller.

9. The paint delivery system of claim 8 wherein the controller is configured to assign a flow value associate with operation of the paint resin flow meter during calibration of the paint resin flow meter and that is at least partly dependent on operation of the linear displacement pump.

10. The paint delivery system of claim 8 wherein the paint resin flow meter is a gear flow meter.

* * * * *